US011876280B2

(12) United States Patent
Wittwer et al.

(10) Patent No.: US 11,876,280 B2
(45) Date of Patent: Jan. 16, 2024

(54) DEPLOYABLE ANTENNA APPARATUS WITH INFLATE TO LATCH MECHANISM

(71) Applicant: VIASAT, INC., Carlsbad, CA (US)

(72) Inventors: David C. Wittwer, Chandler, AZ (US); David D. Greenidge, Longmont, CO (US); Michael T. Kretsch, San Diego, CA (US); Kevin D. House, Gilbert, AZ (US); Mark D. Vossler, Tempe, AZ (US)

(73) Assignee: VIASAT, INC., Carlsbad, CA (US)

(*) Notice: Subject to any disclaimer, the term of this patent is extended or adjusted under 35 U.S.C. 154(b) by 0 days.

(21) Appl. No.: 18/250,484

(22) PCT Filed: Oct. 14, 2021

(86) PCT No.: PCT/US2021/054985
§ 371 (c)(1),
(2) Date: Apr. 25, 2023

(87) PCT Pub. No.: WO2022/081844
PCT Pub. Date: Apr. 21, 2022

(65) Prior Publication Data

US 2023/0327314 A1 Oct. 12, 2023

Related U.S. Application Data

(60) Provisional application No. 63/091,909, filed on Oct. 14, 2020.

(51) Int. Cl.
*H01Q 1/10* (2006.01)
*H01Q 1/08* (2006.01)
(Continued)

(52) U.S. Cl.
CPC ............. *H01Q 1/081* (2013.01); *H01Q 1/103* (2013.01); *H01Q 1/288* (2013.01); *H01Q 15/0013* (2013.01)

(58) Field of Classification Search
CPC ........ H01Q 1/081; H01Q 1/103; H01Q 1/288; H01Q 15/0013
See application file for complete search history.

(56) References Cited

U.S. PATENT DOCUMENTS

2003/0052757 A1 3/2003 Mckinzie, III et al.
2010/0231479 A1 9/2010 Hauhe et al.
(Continued)

OTHER PUBLICATIONS

Lokman, et al., "Gain enhanced circularly polarized antenna integrated with artifical magnetic conductor for S-band pico-satellites", XP002805237, Database accession No. E20183705802041 sections 2 and 4; pp. 2,3,5,6; figures 6,12,13 & International Journal of RF and Microwave Computer-Aided Engineering 20180901 John Wiley and Sons Inc. USA, vol. 28, No. 7, Sep. 1, 2018 (Sep. 1, 2018), DOI: 10.1002/MMCE.21462 (2 pages).
(Continued)

*Primary Examiner* — Daniel Munoz
(74) *Attorney, Agent, or Firm* — F. CHAU & ASSOCIATES, LLC

(57) ABSTRACT

An AMC antenna apparatus includes a ground plane and a flexible antenna element layer above the ground plane. The ground plane includes a conductive base surface, a plurality of flexible conductors, and a frequency selective surface (FSS) layer above the base surface, where the FSS layer includes a plurality of conductive patches separated from one another. Each of the flexible conductors electrically connects one of the conductive patches to the base surface. A latch mechanism is arranged between the base layer and the FSS layer. An inflatable bladder system between the base layer and the FSS layer is configured to receive a gas input during deployment of the antenna apparatus and inflate to produce force sufficient to cause the latch mechanism to transition from an unlatched state to a latched state in which
(Continued)

the conductive base surface is fixedly separated from the FSS layer at a predetermined distance.

17 Claims, 12 Drawing Sheets

(51) Int. Cl.
*H01Q 15/00* (2006.01)
*H01Q 1/28* (2006.01)

(56) References Cited

U.S. PATENT DOCUMENTS

2020/0014104 A1* 1/2020 Georgakopoulos ...... H01Q 3/01
2023/0116334 A1* 4/2023 Martek .................. H01Q 1/081
343/702

OTHER PUBLICATIONS

International Search Report and Written Opinion dated Jan. 28, 2022 in corresponding PCT Application No. PCT/US2021/054985 (13 pages).

* cited by examiner

DEPLOYABLE ANTENNA APPARATUS WITH INFLATE TO LATCH MECHANISM

CROSS REFERENCE TO RELATED APPLICATION

This application claims priority to U.S. Provisional Application No. 63/091,909, filed in the U.S. Patent and Trademark Office on Oct. 14, 2020, the entire contents of which are incorporated herein by reference.

TECHNICAL FIELD

This disclosure relates generally to storage and deployment techniques for antennas with ground planes; and to artificial magnetic conductor (AMC) antennas.

DISCUSSION OF RELATED ART

In a traditional antenna over a ground plane, the radiating element is spaced one quarter wavelength (λ/4) from the ground plane to achieve constructive interference with the reflected signal and thereby increase directivity. At relatively low frequencies, however, the λ/4 distance may be longer than desired, resulting in a thick antenna profile (e.g., 25 cm at 300 MHz).

With an artificial magnetic conductor (AMC) ground plane, the spacing between the ground plane and the radiating element is significantly smaller, and comparable directivity performance may be realized for the antenna. An AMC ground plane may include a conductive base surface and a "frequency selective surface" (FSS) composed of a plurality of conductive patches separated from one another. The conductive patches may be electrically connected to the base surface through respective wires which are typically embedded within a low loss dielectric. The resulting structure, although thinner than traditional ground plane based antennas, is stiff and burdensome to transport, particularly for large aperture antennas configured for frequencies below 1 GHz.

SUMMARY

In an aspect of the present disclosure, an artificial magnetic conductor (AMC) antenna apparatus includes a ground plane and a flexible antenna element layer including at least one antenna element above the ground plane. The ground plane includes a conductive base surface, a plurality of flexible conductors, and a frequency selective surface (FSS) layer above the base surface, where the FSS layer includes a plurality of conductive patches separated from one another. Each of the flexible conductors electrically connects one of the conductive patches to the base surface. A latch mechanism is arranged between the base layer and the FSS layer. An inflatable bladder system is disposed between the base layer and the FSS layer and configured to receive a gas input during deployment of the antenna apparatus and inflate to produce force sufficient to cause the latch mechanism to transition from an unlatched state to a latched state in which the conductive base surface is fixedly separated from the FSS layer at a predetermined distance.

The AMC antenna apparatus may further include a retaining structure configured to retain, when the AMC antenna apparatus is stowed: (i) the antenna element layer; (ii) the ground plane with the FSS layer collapsed towards the base surface; and (iii) the inflatable bladder system. The retaining structure may retain the antenna element layer, the ground plane, and the inflatable bladder system in a coiled state.

The AMC antenna apparatus may further include at least one actuator configured to remove the antenna element layer, the ground plane, and the inflatable bladder system from the retaining structure.

In another aspect, a method of deploying an AMC antenna on an unmanned carrier is provided. The AMC antenna includes: (i) an antenna element layer; and (ii) a ground plane with a conductive base surface, an FSS layer, and a plurality of flexible conductors electrically and mechanically coupling the conductive base surface to the FSS layer. The method involves, during deployment of the AMC antenna: removing the AMC antenna from the retaining structure using an actuator; and inflating the inflatable bladder to produce a force sufficient to cause the latch mechanism to transition from an unlatched state to a latched state. In the latched state, the conductive base surface is fixedly separated from the FSS layer by a predetermined distance.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Figure 1:
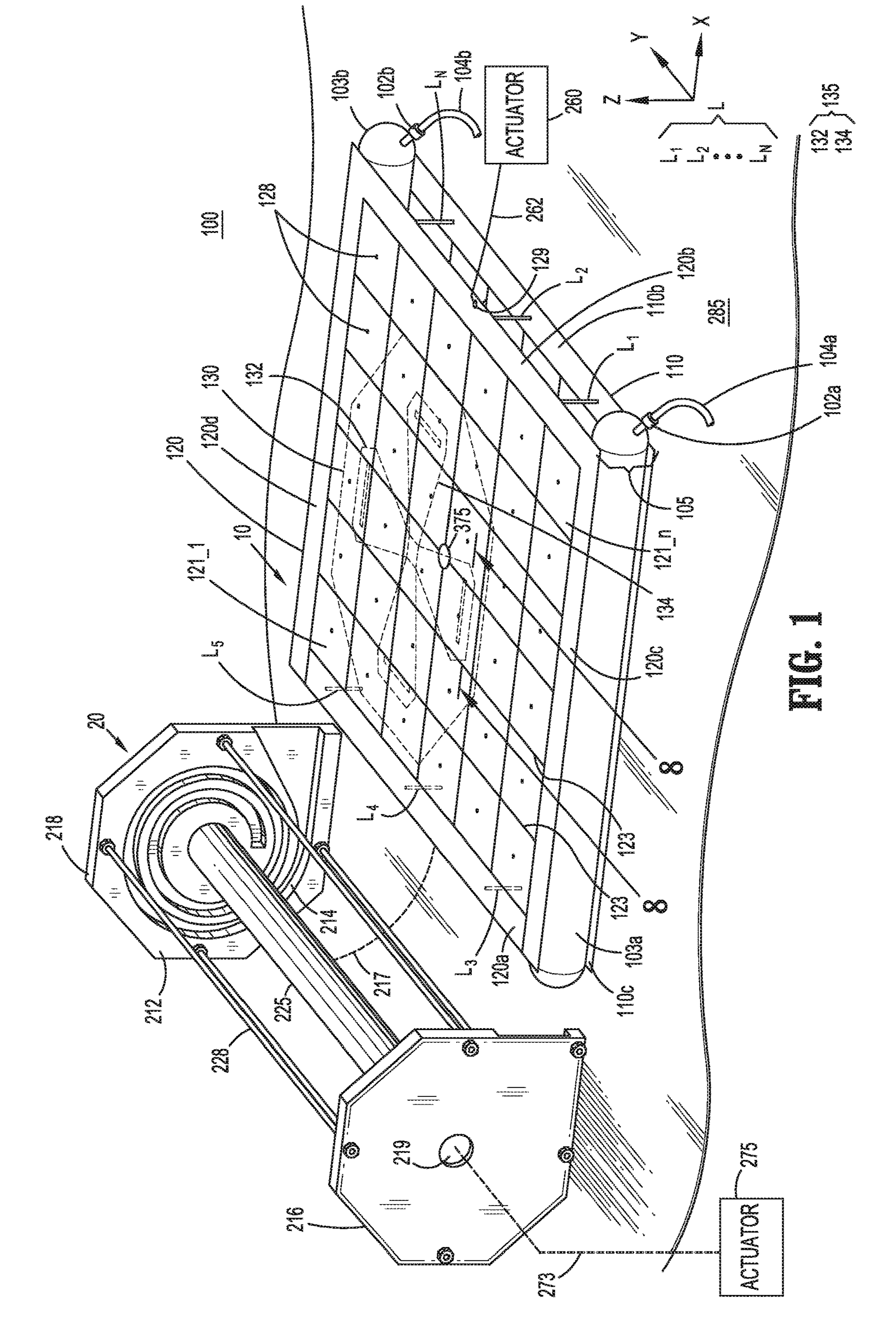
FIG. 1 is a perspective view of an example AMC antenna apparatus in an operational configuration, according to an embodiment.

FIG. 1 is a perspective view of an example artificial magnetic conductor (AMC) antenna apparatus, 100, in an operational configuration, according to an embodiment. AMC antenna apparatus 100 may include an AMC antenna 10 and a retaining structure 20 for retaining AMC antenna 10 during stowage. (Note that AMC antenna 100 may also be referred to herein sometimes as an AMC antenna apparatus, interchangeably.) FIG. 1 depicts AMC antenna 10 in a configuration following its removal from retaining structure 20 and subsequent to operations that transform its structure from a collapsed configuration to an expanded, operational configuration, described hereafter.

Figure 2:
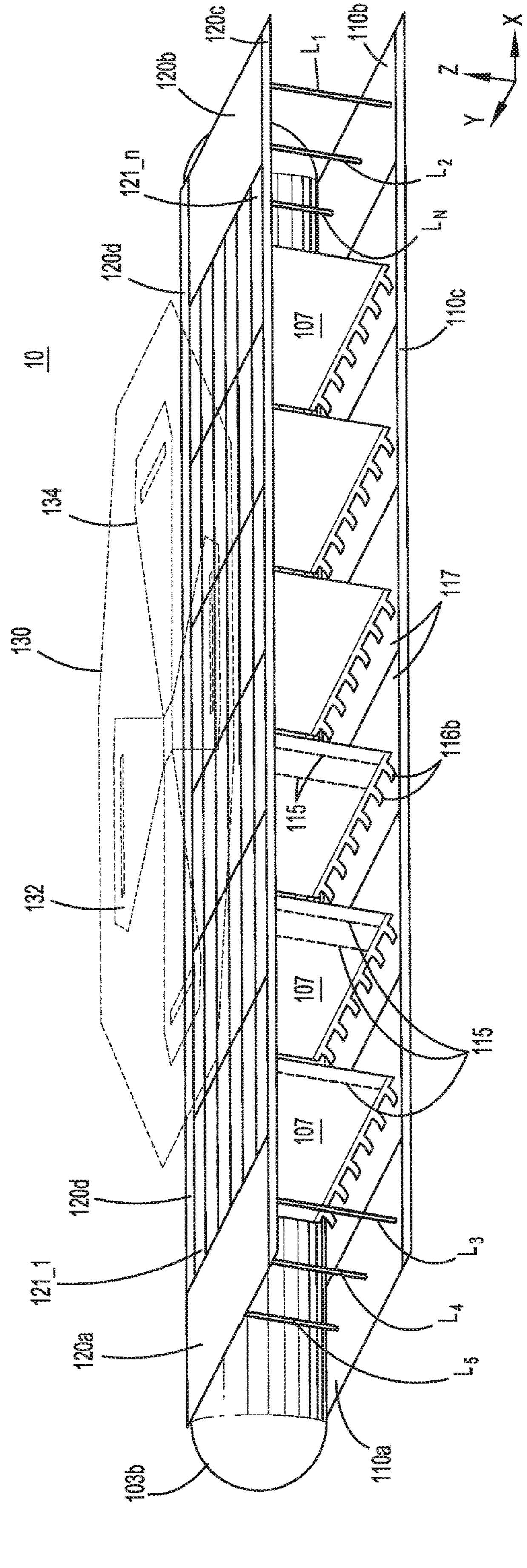
FIG. 2 is a cut-away perspective view showing an example structure of a portion of the AMC antenna apparatus of FIG. 1.

FIG. 2 is a cut-away perspective view showing an example structure of a portion of the AMC antenna apparatus of FIG. 1. Referring collectively to FIGS. 1 and 2, AMC antenna 10 may include a ground plane 105, an antenna element layer 130 with at least one antenna element 135, and an antenna feed (e.g., 300 of FIG. 11, omitted from FIGS. 1 and 2 for clarity). Ground plane 105 may include: a base layer 110 having a conductive base surface; a frequency selective surface (FSS) layer 120; and a plurality of flexible conductors 115 electrically connecting FSS layer 120 to the conductive base surface. A conductor 115 can comprise an electrically conductive material such as a metal. A conductor 115 can be in any of a variety of possible forms. For example, a conductor 115 can be a wire, a column, a spring, a trace, or the like.

Ground plane 105 with such a textured surface configuration of conductive features may be understood as a "high impedance surface" within a given frequency band, in which surface wave modes differ significantly from those on a smooth metallic surface. (Note that the term "frequency selective surface (FSS)" emphasizes the frequency sensitive nature of the high impedance surface.) Ground plane 105 may also be understood as an "in-phase reflector" with suppressed surface waves. The textured structure of ground plane 105 enables AMC antenna 10 to be made substantially thinner than traditional ground plane antennas, i.e., non-AMC antennas with a radiating element spaced λ/4 over a ground plane.

AMC antenna 10 further includes a latch mechanism L (e.g., comprising individual latches $L_1$ to $L_N$) between base layer 110 and FSS layer 120. Latch mechanism L is configured to transition from an unlatched state to a latched state when AMC antenna 10 is deployed from a stowed configuration. In the latched state, illustrated in FIGS. 1 and 2, base layer 110 is fixedly separated from FSS layer 120 by a predetermined distance. AMC antenna 10 further includes an inflatable bladder system, e.g., with a first bladder 103*a* ("first bladder portion") and a second bladder 103*b* ("second bladder portion") between base layer 110 and FSS layer 120. As described further below, when the inflatable bladder system is deflated and latch mechanism L is unlatched, FSS layer 120 may collapse against base layer 110, rendering the resulting AMC antenna 10 structure very thin. This enables AMC antenna 10 to be stowed in a coiled configuration within retaining structure 20. When AMC antenna 10 is removed from retaining structure 20 on a surface 285 of a carrier such as an orbital satellite, the bladder system receives a gas input to set up AMC antenna 10 in its operational configuration. To this end, the bladder system inflates to produce force sufficient to cause latch mechanism L to transition from the unlatched state to the latched state, whereby FSS layer 120 is appropriately separated from base layer 110 by the desired predetermined distance.

Figure 5:
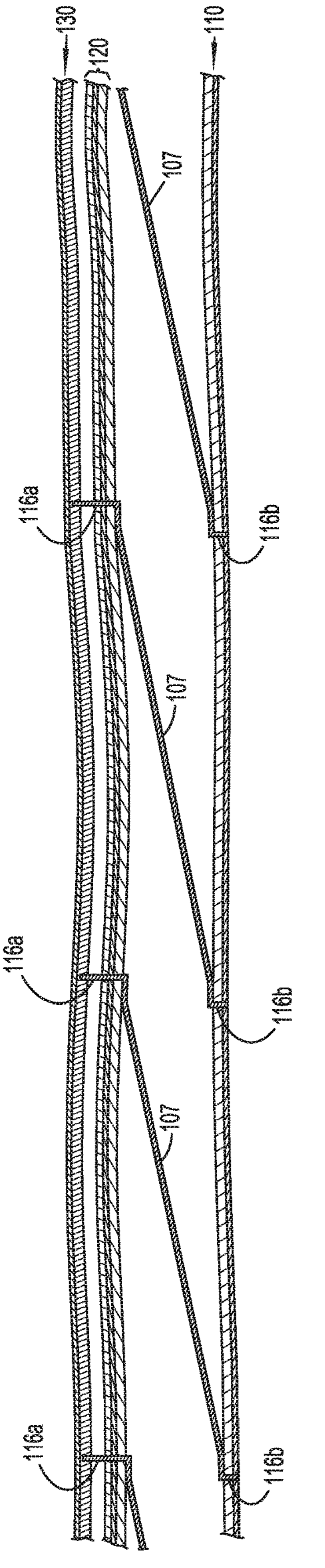
FIG. 5 is a cross-sectional view of a portion of the AMC antenna apparatus of FIG. 1, illustrating various structures thereof in a collapsed state during stowage.

A plurality of flexible printed circuit boards (PCBs) 107 may each be disposed between base layer 110 and FSS layer 120, where each PCB 107 includes a group of the flexible conductors 115. As illustrated in FIG. 2, each PCB 107 may be oriented substantially orthogonal to base layer 110 and FSS layer 120 when the latch mechanism is in the latched state. As illustrated in FIG. 5 discussed below, each PCB 107 may at least partially collapse with respect to base layer 110 and FSS layer 120 when latch mechanism L is unlatched. In this state, a major surface of each PCB 107 may tilt towards base layer 110, closing the air gap between base layer 110 and FSS layer 120 to provide a compact configuration for stowing. It is noted here that in other embodiments, the flexible conductors 115 are provided between FSS layer 120 and base layer 110 as stand-alone conductors without embedding within PCBs 107 (PCBs 107 are omitted).

FSS layer 120 includes a plurality of conductive patches 121_1 to 121_*n* separated from one another by narrow isolation regions ("streets") 123. Each conductive patch 121 may include a conductive surface printed on a thin dielectric sheet such as a polyimide film (e.g., Kapton®), and the isolation regions 123 may be regions of the dielectric sheet without a printed conductor. Thus, conductive patches 121_1 to 121_*n* along with the dielectric sheet (and in some cases, an additional dielectric sheet on the opposite side of the printed conductor) may collectively form a continuous sheet-like or sandwich-type structure. The width of an isolation region 123 is small relative to the area of a conductive patch 121, generating a capacitance between adjacent conductive patches 121 that contributes to forming the high impedance surface. Each conductor 115 may be oriented in the z (vertical) direction and electrically connect one of the conductive patches 121 to the conductive base surface of base layer 110, such that a "bed of nails" structure (reinforced with the dielectric of PCBs 107) is provided between base layer 110 and FSS layer 120. Each of base layer 110, FSS layer 120 and antenna element layer 130 may be flexible sheet-like structures having major surfaces oriented in the x-y plane.

Through suitable design of the number, geometry and layout of conductive patches 121; the at least one antenna element of antenna layer 130; the lengths of conductors 115;

and the spacing between antenna element layer 130 and FSS 120, an AMC phenomenon is realizable. As noted, the AMC phenomenon enables AMC antenna 10 to be significantly thinner than the traditional antenna having a radiating element spaced λ/4 over a ground plane. For instance, the AMC phenomenon allows for efficient antenna performance with spacing between the antenna element layer 130 and base surface 119«λ/4, e.g., in the λ/40 to λ/10 range. Such efficiency may be realized due to in-phase reflection and suppression of surface waves. Thus, despite the close spacing between the layers, constructive interference occurs between a signal radiated directly into free space by antenna element layer 130 and the same signal initially propagated towards, and then reflected from, ground plane 105.

In the embodiment of FIG. 1, an example antenna element 135 is illustrated as a crossed-dipole including a first dipole element 132 and a second dipole element 134 orthogonal to first dipole element 132. Other types of antenna elements may be substituted, such as a single dipole, a loop antenna, an array of microstrip patch elements, and so forth. The crossed-dipole 135 may be printed on a dielectric sheet, illustrated with a hexagonal shape occupying a smaller surface area than each of FSS layer 120 and base layer 110 in FIG. 1. In other examples, antenna element layer 130 is coextensive in the x-y plane with each of FSS layer 120 and base layer 110. An example construction of ground plane 105 may include a plurality of dielectric or metallic ribs 117, each oriented longitudinally in the y or x directions, for added structural support of bottom ends of conductors 115. For example, ribs 117 may be arranged in a lattice pattern comprising rows (e.g., oriented along or substantially parallel to the x axis in FIG. 2) of multiple ribs and columns (e.g., oriented along or substantially parallel to the y axis in FIG. 2) of multiple ribs. As another example, as illustrated in FIG. 2, each rib 117 may extend substantially the length (e.g., oriented along or substantially parallel to the y axis of FIG. 2) of the base layer 110. As yet another example, the base layer 110 may comprise one or more continuous ribs 117. As still another example, the base layer 110 may not include ribs 117. Conductive patches 121_1 to **121_*n* may each be arranged in a lattice and have identical geometries, e.g., all rectangular or all square as depicted, or alternatively all hexagonal, all circular or other suitable shape. Conductive patches 121_1 to 121_*n* may also be configured with identical or substantially identical dimensions (e.g., within manufacturing tolerances) in some embodiments. Each conductive patch 121 may electrically connect to a respective conductor 115 through a connection 128** in a central location thereof.

Figure 3:
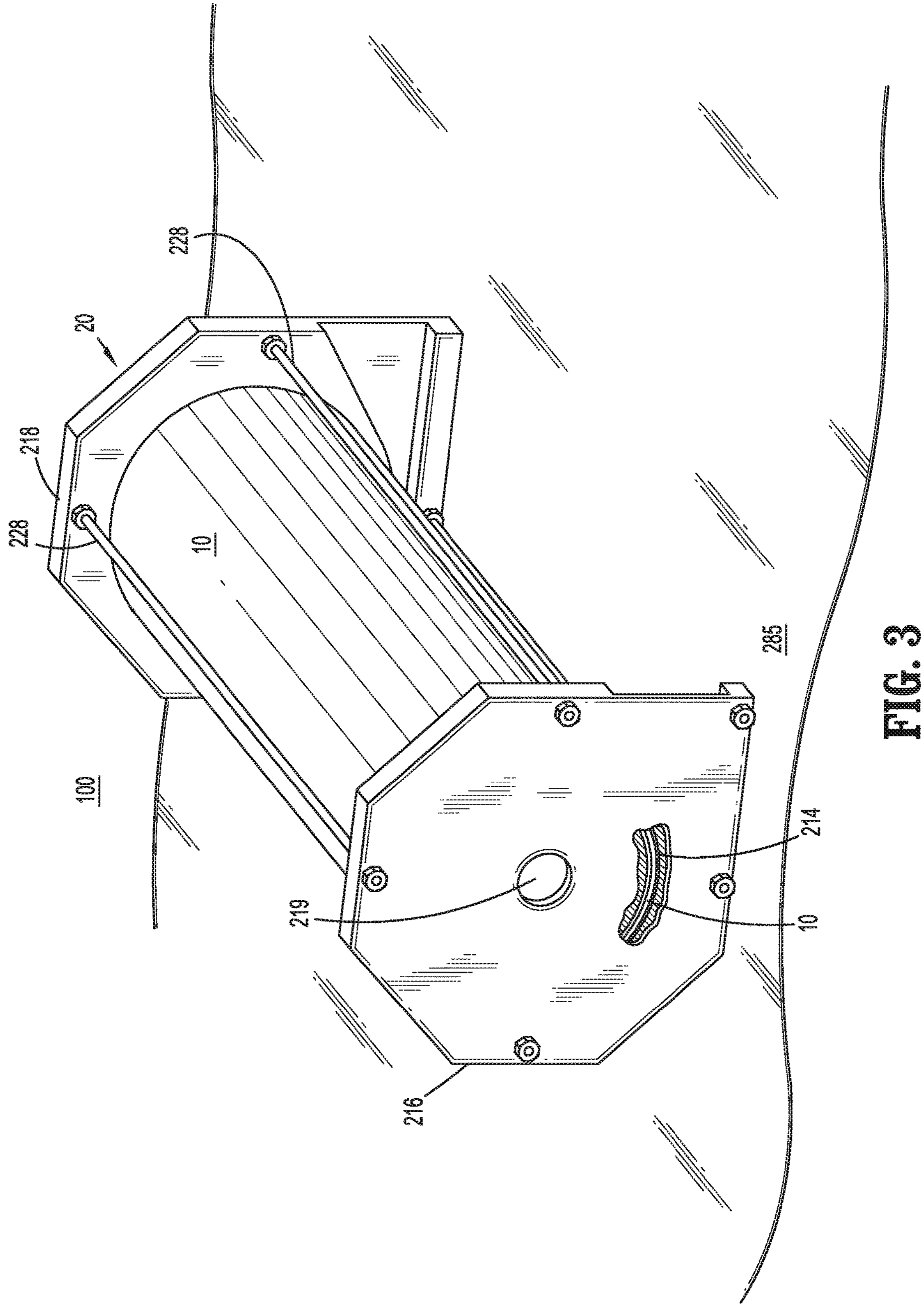
FIG. 3 is a perspective view showing a retaining structure of the AMC antenna apparatus retaining the AMC antenna of FIG. 1 in a coiled configuration during stowage.

FIG. 3 is a perspective view showing retaining structure 20 of AMC antenna apparatus 100 retaining AMC antenna 10 in a coiled configuration during stowage. All of the elements of AMC antenna 10 illustrated in FIGS. 1 and 2 may be retained coiled within retaining structure 20. In addition, other elements of AMC antenna 10 described hereafter, e.g., an antenna feed and balun(s), may be stored coiled within retaining structure 20. The balun(s) may be hardwired to an RF front end located externally of retaining structure 20 through a flexible cable(s) having a section wound within retaining structure 20 and unwound when AMC antenna 10 is removed from retaining structure 20.

Figure 4:
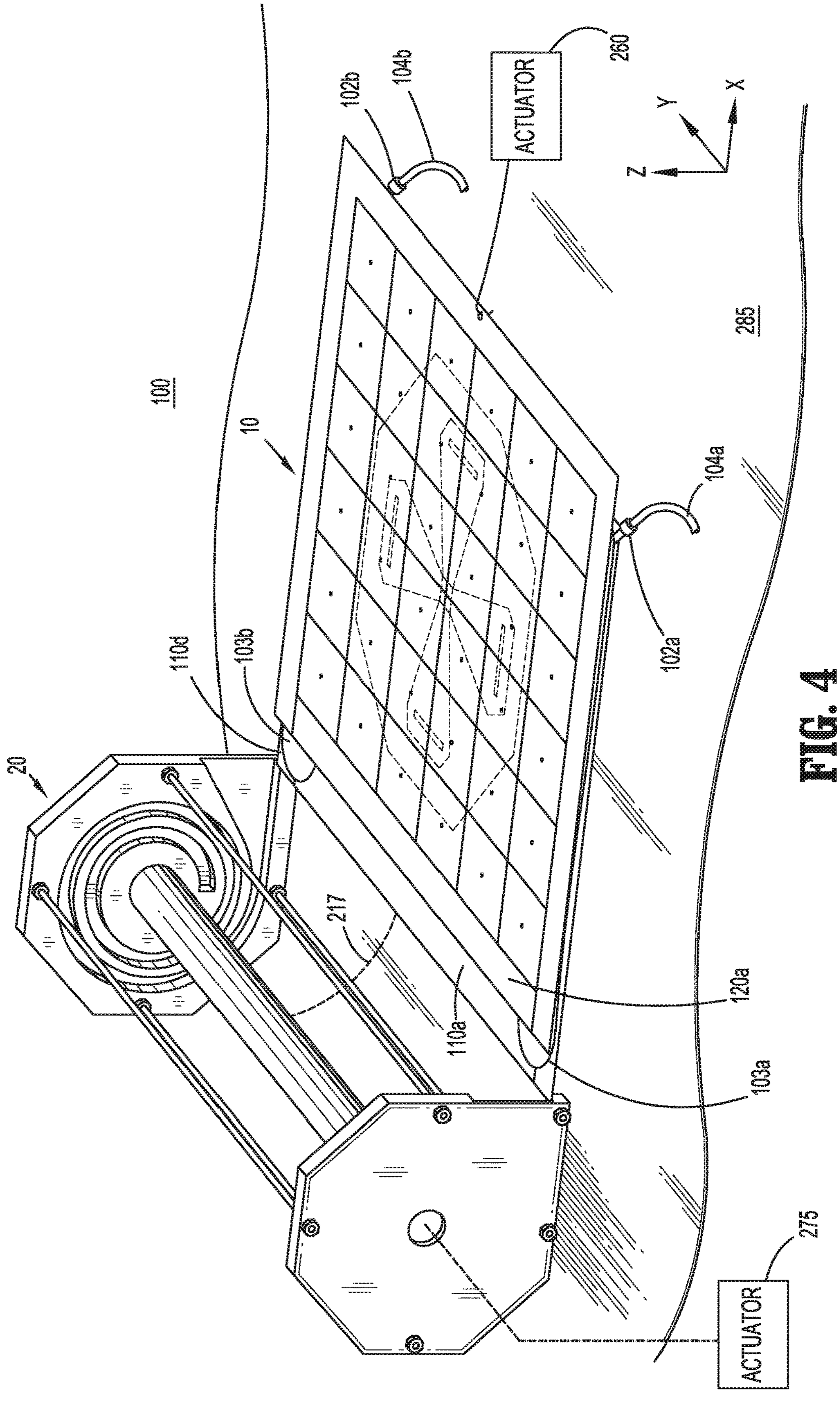
FIG. 4 is a perspective view showing the AMC antenna apparatus of FIG. 1 immediately after removal of the AMC antenna from the retaining structure during deployment.

FIG. 4 is a perspective view depicting AMC antenna 10 immediately after removal thereof from retaining structure 20 during deployment. The view of FIG. 4 also illustrates an example arrangement of AMC antenna 10 with respect to retaining structure 20 prior to insertion therein. In these conditions, bladders **103*a* and 103*b* are deflated, such that FSS layer 120 may be collapsed against base layer 110 (latching mechanism L is unlatched and may be lying flat between FSS layer 120 and base layer 110 during the deflated state of the bladder system). The resulting structure of AMC antenna 10 is flattened such that it may be readily inserted and coiled within retaining structure 20 during initial stowage, and subsequently uncoiled for removal during deployment. Bladder 103*a* may include a gas insertion port 102*a* coupled to a gas line 104*a*. Bladder 103*b* may include a gas insertion port 102*b* coupled to a gas line 104*b*. Following removal from retaining structure 20, gas may be inserted into each of gas lines 104*a* and 104*b* to inflate bladders 103*a* and 103*b* to inflated states such as that illustrated in FIG. 1. It is noted here that at least one additional bladder portion of the bladder system may be provided within AMC antenna 10, e.g., an oblong bladder arranged longitudinally between peripheral portions 110*a* and 120*a*. The additional bladder may have its own insertion port and gas line or may be coupled to each of bladders 103*a* and 103*b* to provide a continuous bladder system arranged along three sides of AMC antenna 10. In the latter case, only one port and gas line, e.g., 102*a* and 104*a***, may be included in the bladder system. The illustrated bladder system is an example. The bladder system can have different configurations and arrangements of bladders.

With continuing reference to FIGS. 1-4, latching mechanism L is exemplified as comprising a plurality of latches $L_1$ to $L_N$ (e.g., N=6 as depicted) distributed along opposite peripheral portions of AMC antenna 10. For instance, FSS layer 120 may include first through fourth oblong peripheral portions (strips) **120*a*, 120*b*, 120*c* and 120*d*, which may overlay corresponding peripheral portions 110*a*, 110*b*, 110*c* and 110*d*, respectively, when the bladder system is inflated. A first group of latches, $L_1$, $L_2$ and $L_N$ may be distributed between peripheral portions 110*b* and 120*b*, and a second group of latches, $L_3$, $L_4$ and $L_5$, may be distributed between peripheral portions 110*a* and 120*a*. Bladder 103*a* is disposed between peripheral portions 110*c* and 120*c*; bladder 103*b* is disposed between peripheral portions 120*d* and 110*d*. In other embodiments, one or more additional latches may be distributed adjacent to bladder 103*a* between peripheral portions 110*c* and 120*c*, and one or more further latches may be disposed adjacent to bladder 103*b* between peripheral portions 110*d* and 120*d***.

Retaining structure 20 in this embodiment is a generally cylindrical structure with first and second opposite end walls 216 and 218, a spindle 225 between end walls 216 and 218, and support rods 228 that couple end walls 216 and 218 to one another. Each of end walls 216, 218 may have a spiraling groove 214 on an inner surface 212 thereof to facilitate guiding and retaining AMC antenna 10 in a coiled configuration. Opposite edge portions of at least ground plane 105 are retained coiled within the pair of spiraling grooves 214 during stowage. If antenna layer 130 is configured coextensive with ground plane 105, opposite edge portions of antenna layer 130 may also be retained within spiraling grooves 214.

Spindle 225 may have a mechanical link 272 (shown schematically) to peripheral portion **110*a* of base layer 110. To initially retain AMC antenna 10 within retaining structure 20, AMC antenna 10 may be placed in a collapsed state as shown in FIG. 4. In the collapsed state, conductors 115 are bent and FSS layer 120 is collapsed towards base layer 110 such that the thickness of at least the edge portions of the collapsed structure is thinner than the width of grooves 214. Note that in the collapsed state, FSS layer 120 may be collapsed towards base layer 110 in the +x direction such that FSS layer 120 is offset with respect to base layer 110. Because the two layers are offset in the collapsed condition, peripheral portion 110***a* of base layer 110 is no longer overlaid by the corresponding peripheral portion 120*a* of FSS layer 120.

Spindle 225 may be rotated (e.g., clockwise) to draw AMC antenna 10 within retaining structure 210. As an example, a hand crank (not shown) or an actuator 275 with link 273 may be coupled to an end 219 of spindle 225 to impart a rotational force to draw AMC antenna 10 within retaining structure 210. Once AMC antenna 10 is so retained, AMC antenna apparatus 100 may be transported to a carrier, such as an orbital satellite prior to launch, and secured to surface 285 of the carrier. Since retaining structure 20 is more robust to environmental conditions and motion than AMC antenna 10 itself (if otherwise mounted on surface 285 without protection), securing retaining structure 20 to surface 285 prior to deployment of AMC antenna 10 on surface 285 may improve the odds of successful deployment. As another example, surface 285 is a planetary surface or a surface of a man-made structure on a planet. In this case, retaining structure 20 with AMC antenna 10 secured therein may be transported by a drone and dropped onto surface 285 for subsequent unmanned deployment.

To deploy AMC antenna 10 from retaining structure 20, spindle 225 may be rotated (e.g., counter-clockwise) by actuator 275, whereby AMC antenna 10 may slide out in a plate-like configuration while in its collapsed state in the +x direction. Alternatively, or additionally, another actuator 260 arranged on surface 285 may automatically pull out AMC antenna 10 from retaining structure 20. To this end, AMC antenna 10 may have an opening 129 on peripheral portion 120*b*, through which a link 262 of actuator 260 may attach to AMC antenna 10. Note that actuator 260 and/or actuator 275 may be a robotic arm secured to surface 285.

FIG. 5 is a cross-sectional view of a portion of AMC antenna 10, illustrating various structures thereof in a collapsed state during stowage. It is seen that in the collapsed state, PCBs 107 are each tilted with respect to FSS layer 120 and base layer 110, such that in the cross-sectional view, each PCB 107 forms an acute angle with base layer 110. Each conductor 115 may include a lower end 116*b* and an upper end 116*a*, discussed below.

Figure 6:
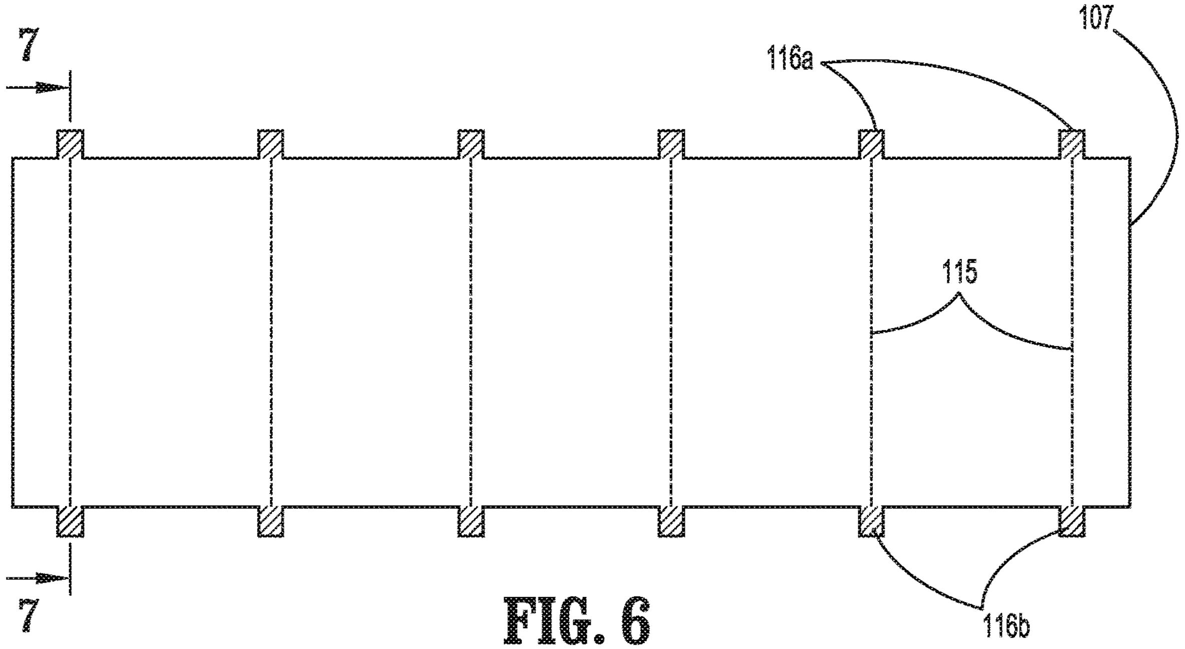
FIG. 6 is a plan view of an example flexible printed circuit board (PCB) included within the AMC antenna apparatus of FIG. 1.
Figure 7:
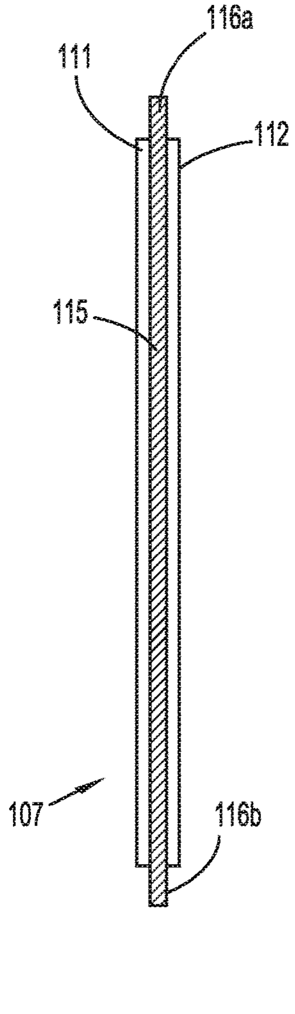
FIG. 7 is a cross-sectional view taken along the lines 7-7 of FIG. 6, illustrating an example layered structure of the flexible PCB.

FIG. 6 is a plan view of an example flexible PCB 107. FIG. 7 is a cross-sectional view taken along the lines 7-7 of FIG. 6, illustrating an example layered structure of a flexible PCB 107. PCB 107 may have a generally rectangular profile. Each PCB 107 may have a group of conductors 115 embedded therein and extending widthwise from edge to edge. Each conductor 115 may include an upper end 116*a* and a lower end 116*b*, each in the form of a rectangular or square tab. Conductors 115 may be sandwiched between a first dielectric film 111 and a second dielectric film 112, e.g., Kapton® or FR4.

Figure 8:
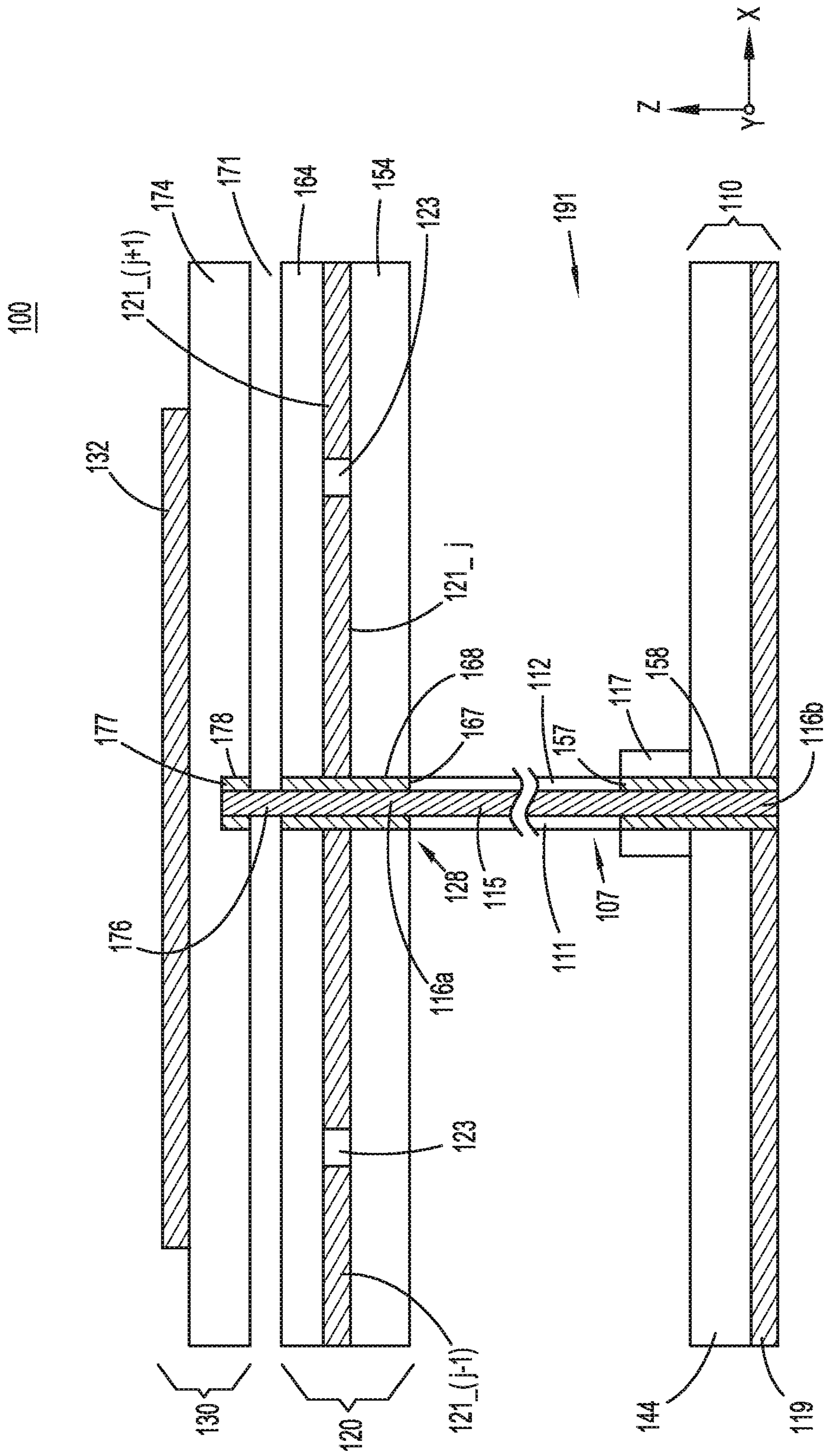
FIG. 8 is a cross-sectional view taken along the lines 8-8 of FIG. 1, depicting an example inter-layer structure of the AMC antenna apparatus.

FIG. 8 is a cross-sectional view taken along the lines 8-8 of FIG. 1, depicting an example inter-layer structure of AMC antenna 10 during an operational (deployed) state. FIG. 8 depicts an example connection structure with respect to a single conductor 115 of a PCB 107 underlaying antenna element layer 130; the same connection structure may be applied with respect to all conductors 115 of AMC antenna 10 underlaying antenna element layer 130. For those conductors 115 outside the region of antenna element layer 130, the upper structure may differ (discussed below). (Note also that in FIG. 8 and other cross-sectional views herein, features located behind those illustrated may be omitted for clarity.) Base layer 110 may include a conductive base surface 119 adhered to or printed at a bottom surface of a flexible dielectric sheet 144 for structural integrity and to facilitate electrical and mechanical connections to conductors 115. A dielectric rib 117 may be adhered to a top surface of dielectric sheet 144 and support a connection of a conductor 115 to base surface 119. A plated through hole 158 may have been formed through rib 117 and base layer 110. A bottom end 116*b* of conductor 115 may have been inserted within through hole 158 and electrically connected to conductive base surface 119 with a conductive adherent 157 surrounding end 116*b* within through hole 158, e.g., solder that was melted and cooled.

FSS layer 120 may include conductive patches 121_1 to 121_*n* sandwiched between a lower dielectric sheet 154 and an upper dielectric sheet 164. Alternatively, FSS layer 120 is constructed with a single dielectric sheet 154 or 164 with conductive patches 121 printed thereon. A mechanical and electrical connection 128 between upper portion of conductor 115 and FSS layer 120 may comprise a plated through hole 168, upper end 116*a*, and a conductive adherent 167 within through hole 168. FIG. 8 depicts a single connection 128 between a conductor 115 and a given conductive patch 121_*j*, which is separated by respective isolation regions 123 from adjacent conductive patches 121_(j−1) and 121_(j+1). Dielectric sheet 164 including isolation regions 123 may have been formed by layered deposition of dielectric material atop conductive patches 121, subsequent to deposition of conductive patches 121 on the upper surface of dielectric sheet 154. However, if dielectric sheet 164 is omitted, isolation regions 123 may be air gaps or a dielectric filler. Each of dielectric sheets 144, 154, 164 and 174 may be a polyimide film such as Kapton®.

Electrical connections 128 throughout AMC antenna 10 may each be provided at a fixed distance above dielectric sheet 144 (with latch mechanism L in the latched state). In this manner, FSS layer 120 is supported with its lower surface uniformly spaced throughout by a fixed distance from base layer 110. An air gap 191 may be present in the regions surrounding conductors 115.

Antenna element layer 130 may include the at least one antenna element 132 printed atop dielectric layer 174. An example mechanical connection between antenna element layer 130 and FSS layer 120 may include a rigid extension portion 176 of upper end 116*a* of conductor 115 extending above the upper surface of dielectric sheet 164, a plated blind via 178 in the lower surface of dielectric sheet 174, and an electrically conductive adherent 177 such as solder. The upper end of extension 176 may have been inserted within via 178 and adhered to dielectric sheet 174 by melting and cooling adherent 177. All or most of conductors 115 underlaying antenna element layer 130 may likewise include an extension 176 adhered to dielectric sheet 174 in this manner. As a result, antenna element layer 130 may be entirely supported by conductors 115 and uniformly spaced a close distance away from the upper surface of FSS layer 120. It is noted that if antenna layer 130 is only centrally located with respect to FSS layer 120, as in the example of FIG. 1, then the conductors 115 located outside the region of antenna layer 130 may omit extensions 176. These peripheral conductors 115 may all be designed with the same or substantially the same length (e.g., within manufacturing tolerances), and the top ends may be flush with the upper surface of dielectric sheet 164. In a similar vein, each of the conductors 115 underlaying antenna layer 130 may be identically or substantially identically designed, with extensions 176 of the same or substantially the same length (e.g., within manufacturing tolerances). With the above-described mechanical connection between FSS layer 120 and antenna element layer 130, a narrow air gap 171 may exist between layers 120 and 130. In an alternative configuration, extensions 176 on conductors 115 are omitted throughout AMC antenna 100; dielectric sheets 164 and 174 are fused or formed as a single dielectric sheet; and no air gap 171 exists between FSS layer 120 and antenna element layer 130.

Figure 9:
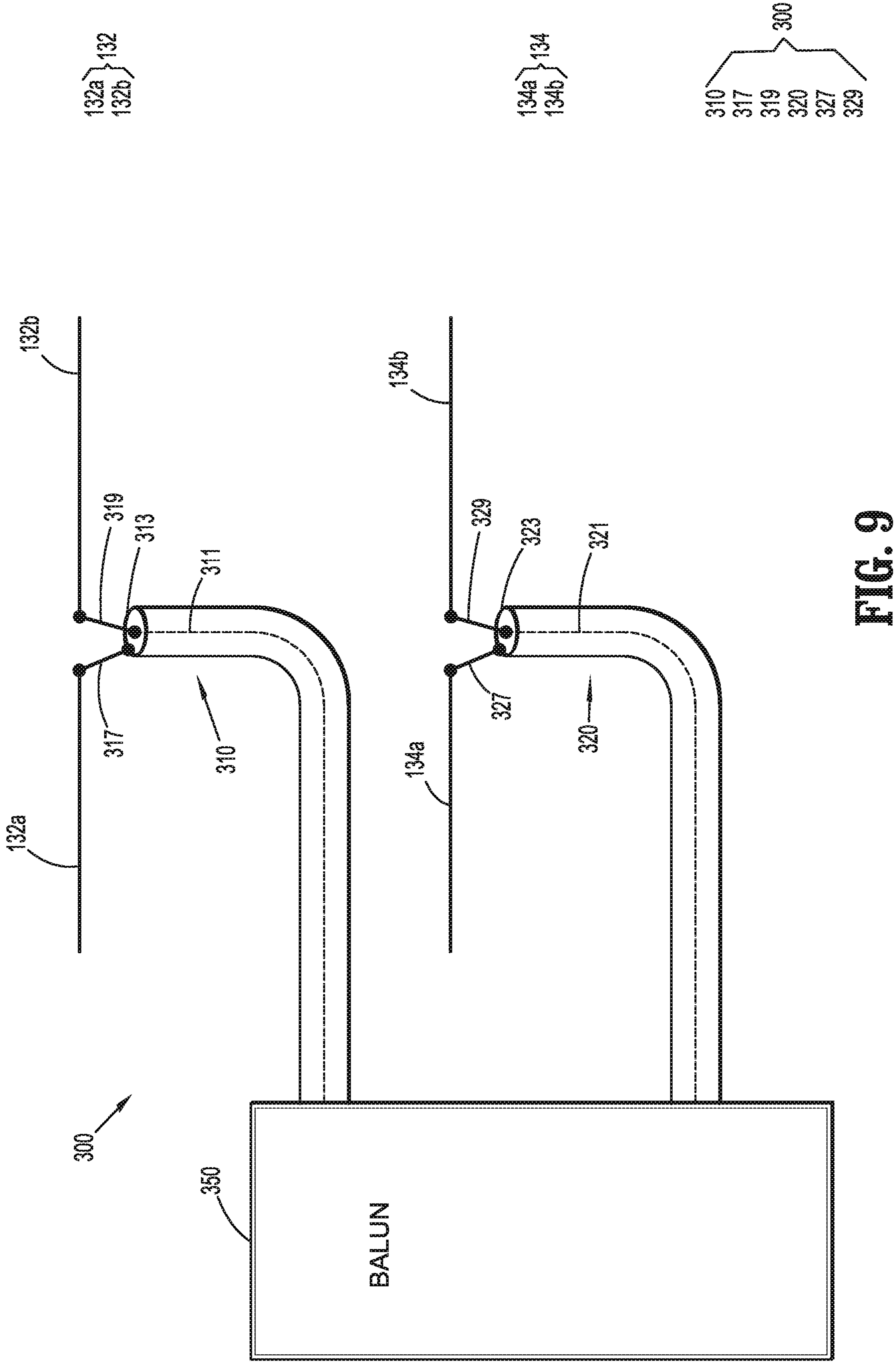
FIG. 9 is a schematic diagram illustrating an example antenna feed connected to an antenna element of the AMC antenna apparatus of FIG. 1.

FIG. 9 is a schematic diagram illustrating an example antenna feed, 300, that may connect to antenna element 135 of AMC antenna 10. Antenna feed 300 may include a pair of baluns 350; a first flexible coaxial cable 310 having a first end connected to baluns 350 and having an outer conductor 313 and an inner conductor 311; a second flexible coaxial cable 320 having a first end connected to baluns 350 and having an outer conductor 323 and an inner conductor 321; and first, second, third and fourth interconnects 317, 319, 327 and 329, respectively. First dipole element 132 includes dipoles arms 132*a* and 132*b*; second dipole element 134 includes dipole arms 134*a* and 134*b*. A second end of first coaxial cable 310 connects to first dipole element 132, with interconnect 317 connecting outer conductor 313 to dipole arm 132*a* and interconnect 319 connecting inner conductor 311 to dipole arm 132*b*. A second end of second coaxial cable 310 connects to second dipole element 134, with interconnect 327 connecting outer conductor 323 to dipole arm 134*a* and interconnect 329 connecting inner conductor 321 to dipole arm 134*b*.

Figure 10:
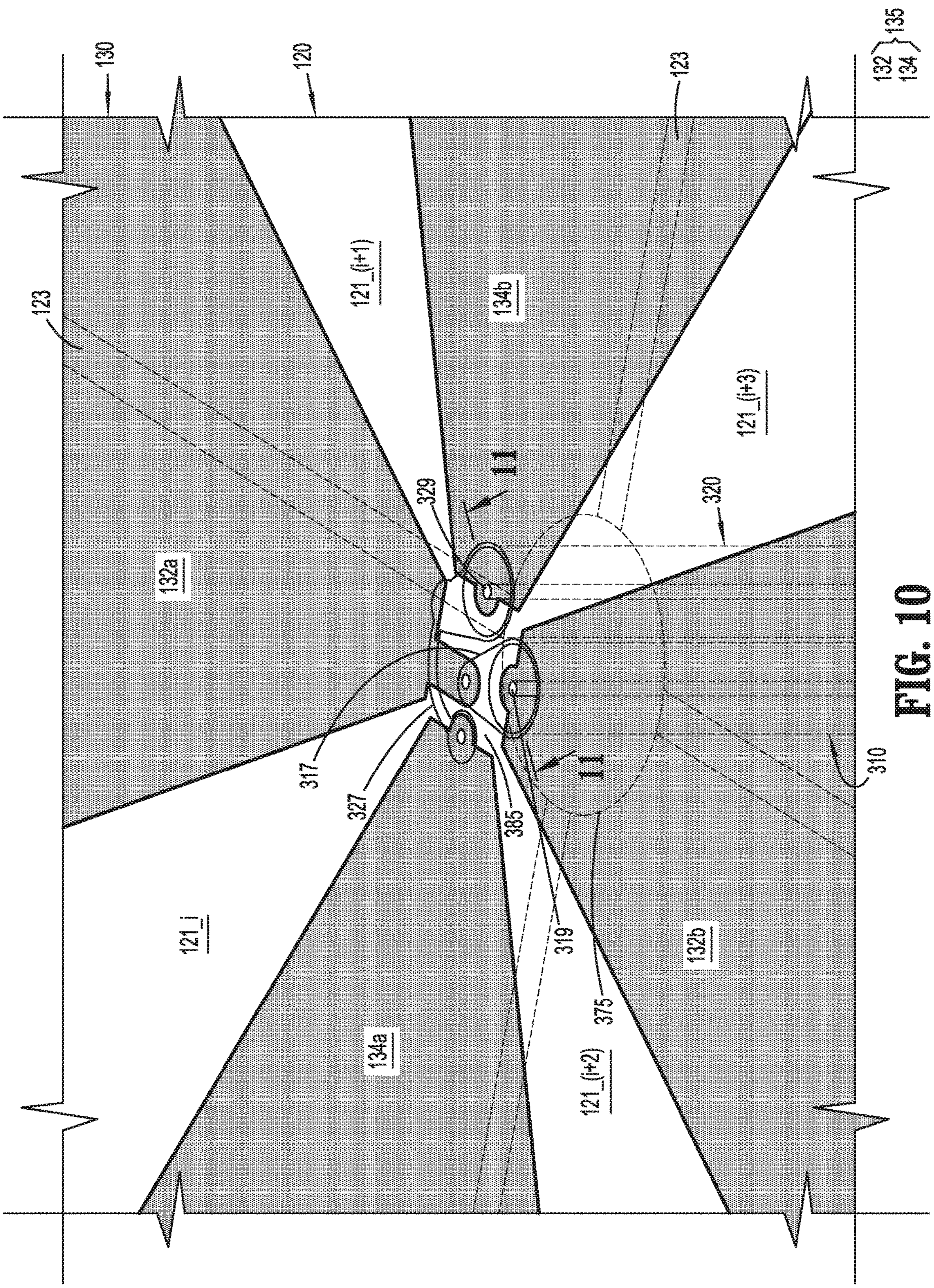
FIG. 10 is a perspective view of a central portion of an upper part of an AMC antenna of FIG. 1, illustrating a portion of the example antenna feed.

FIG. 10 is a perspective view depicting an example central portion of an upper part of AMC antenna 10, illustrating a portion of the example antenna feed 300. A central portion of crossed-dipole antenna element 135 may overlay an intersection region of centralized, adjacent conductive patches 121_*i*, 121_(i+1), 121_(i+2) and 121_(i+3). An opening 375 in FSS layer 120 may be formed in the centralized region, by removing a corner piece of each of conductive patches 121_*i* to 121(*i*+3). Another opening 385 may have been formed in a centralized region of antenna element layer 130. Coaxial cables 310 and 320 may extend vertically (z direction) between antenna element layer 130 and base layer 110 during the deployed state of AMC antenna 10. During the stowage state, coaxial cables may be caused to collapse between antenna element layer 130 and base layer 110.

The second ends of coaxial cables 310 and 320 may penetrate opening 375 and at least partially penetrate opening 385. Interconnects 317 and 327 may each be embodied as wire bonds. Alternatively, interconnects 317 and 327 are in the form of a funnel shaped metal section integrated with a conductive extension. The funnel shaped metal section is soldered or otherwise electrically connected to the respective outer conductors 313 or 323, and the conductive extension is soldered or otherwise electrically connected to an input point of dipole arm 132*a* or 134*a*. Interconnects 319 and 329 may be direct solder connections to input points of dipole arms 132*b* and 134*b*, respectively.

Figure 11:
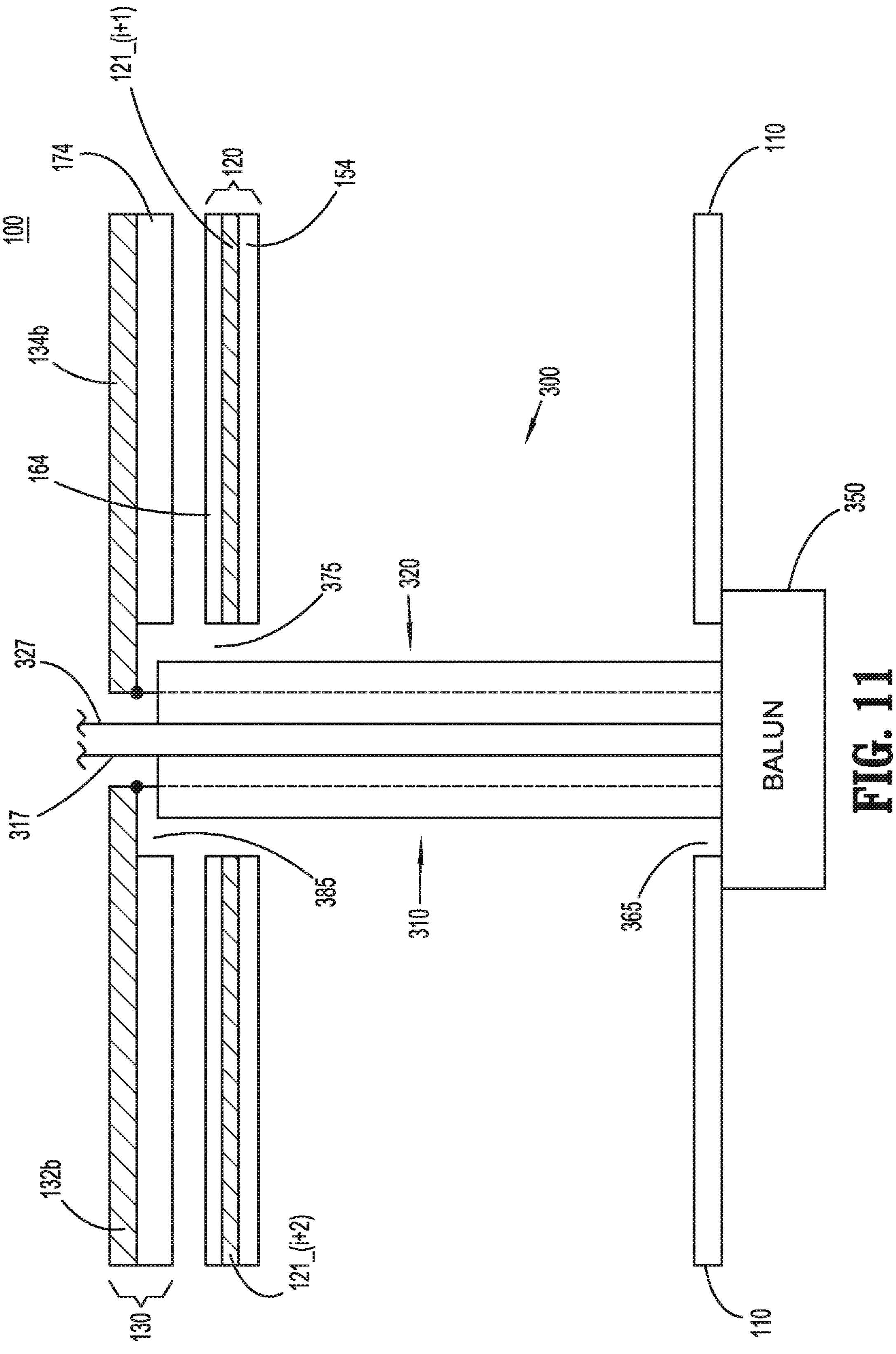
FIG. 11 is a cross-sectional view taken along the lines 11-11 of FIG. 10, depicting an example integration of the antenna feed within the AMC antenna.

FIG. 11 is a cross-sectional view taken along the lines 11-11 of FIG. 10, depicting an example integration of antenna feed 300 within AMC antenna 10. This view shows that baluns 350 may be disposed adjacent to the lower surface of AMC antenna 10, and the lower ends of coaxial cables 310 and 320 may penetrate an opening 365 in base layer 100 and connect to baluns 350. Coaxial cables 310 and 320 may run vertically side by side, with upper ends thereof penetrating opening 375 in FSS layer 120 and opening 385 in dielectric sheet 174 of antenna layer 130 to facilitate the electrical connection to crossed-dipole antenna element 135.

In the stowed state, coaxial cables 310 and 320 may be collapsed similar to conductors 115 (collapsed state illustrated in FIG. 5).

Figure 12A:
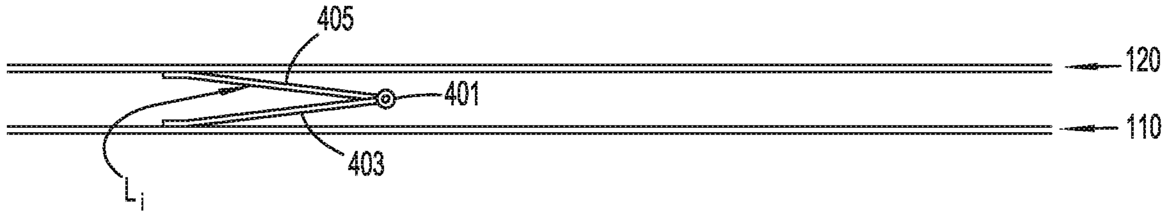
FIG. 12A is a partial end view of the AMC antenna of FIG. 1, illustrating an example latch in a collapsed state of the AMC antenna.
Figure 12B:
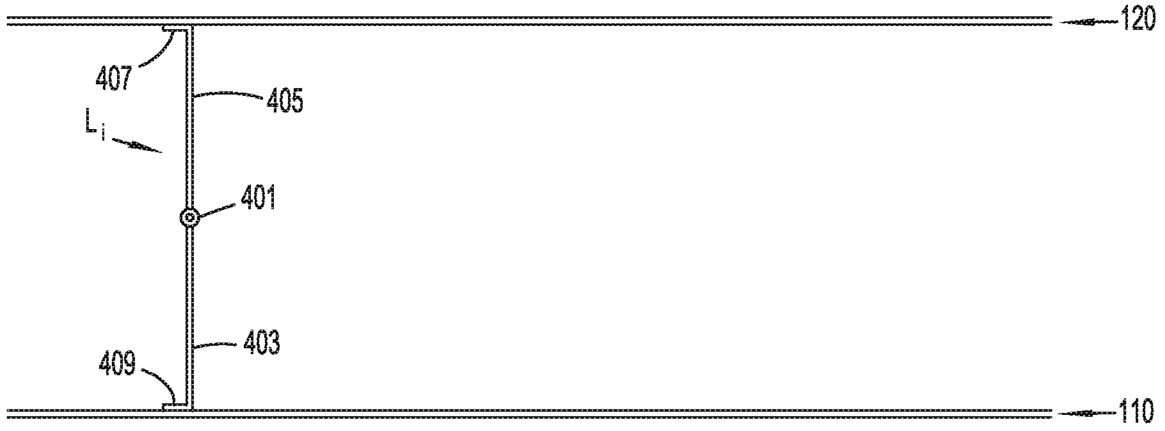
FIG. 12B is a partial end view of the AMC antenna of FIG. 1, illustrating an example latch in a latched state during an operational state of the AMC antenna following deployment.

FIG. 12A is a partial end view of AMC antenna 10, illustrating an example latch, Li, in a collapsed, unlatched state of AMC antenna 10. FIG. 12B is the same partial end view of AMC antenna 10 in a latched, operational state following deployment. Any of latches $L_1$-$L_N$ of AMC antenna 10 may have the structure of latch Li, which may include an upper rod 405, a lower rod 403, and a central latching coupler 401 that couples upper and lower rods 405 and 403. An upper end support 407 may be attached to FSS layer 120 and form a movable joint with an upper portion of upper rod 405. A lower end support 409 may be attached to base layer 110 and form a movable joint with lower rod 403. Thus, in the unlatched state, upper rod 405 forms an acute angle with FSS layer 120 and lower rod 403 forms an acute angle with base layer 110, such that FSS layer 120 and base layer 110 are closely spaced for optimal stowage of AMC antenna 10. In the latched state, upper rod 405 and lower rod 403 are aligned vertically, thereby providing a fixed, predetermined spacing between base layer 110 and FSS layer 120.

Figure 13:
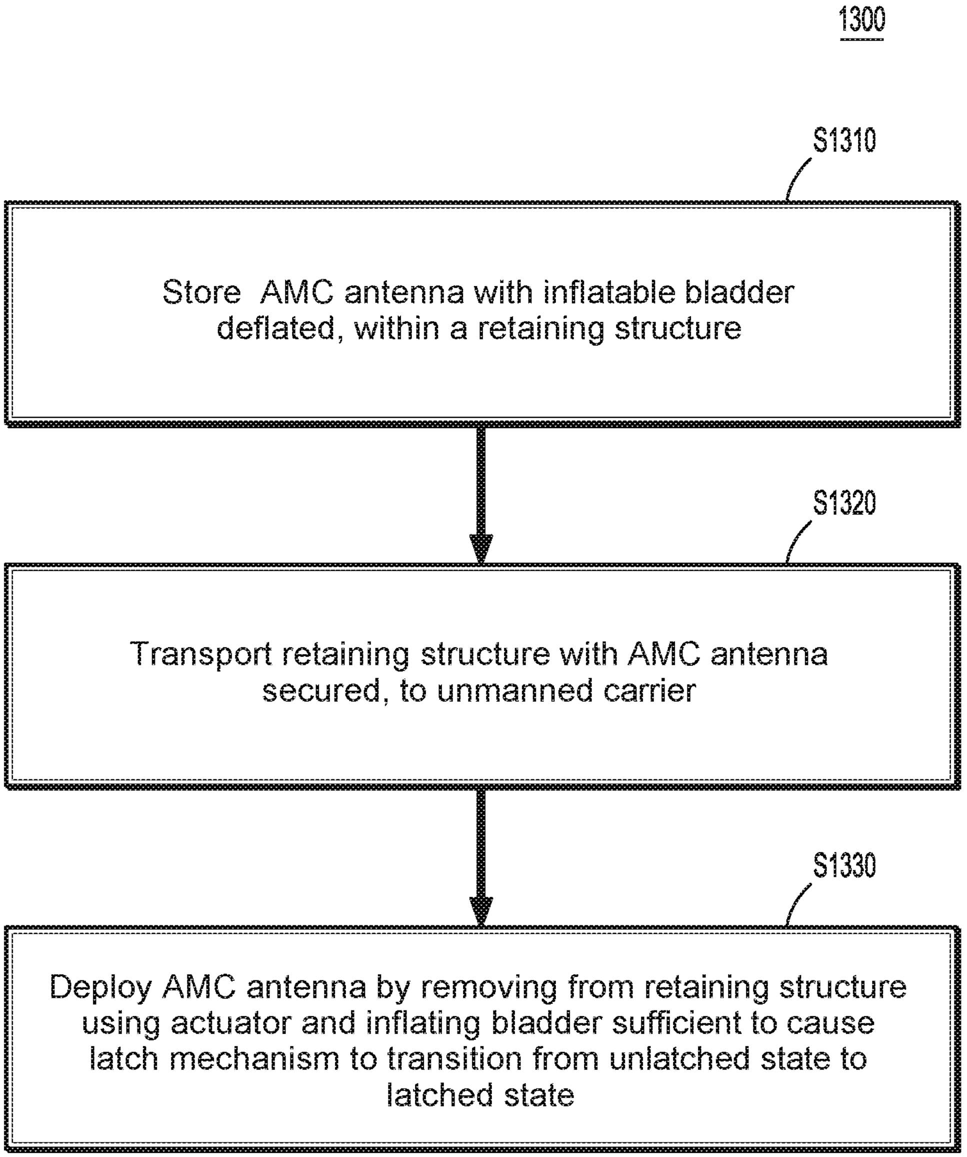
FIG. 13 is a flow chart depicting operations of an example method of deploying an AMC antenna on an unmanned carrier according to an embodiment.

FIG. 13 is a flow chart depicting operations of an example method, 1300, of deploying AMC antenna 10 on an unmanned carrier according to an embodiment. With method 1300, AMC antenna 10 is first stored in its collapsed state in a retaining structure, e.g., retaining structure 20 described above (S1310). The retaining structure may then be transported with AMC antenna 10 stored therein to an unmanned carrier (S1320). As mentioned earlier, some examples of the unmanned carrier (e.g., a carrier including surface 285) include an orbital satellite, a planetary surface or a man-made structure on a planetary surface.

The AMC antenna may then be deployed (S1330) by removing the same from the retaining structure using an actuator (e.g., 275 and/or 260) as described above, and inflating the bladder system (e.g., bladders 103*a* and 103*b*) sufficiently to cause the latch mechanism (e.g., "L") to transition from the unlatched state to the latched state. As a result of the latching, FSS layer 120 becomes properly spaced from base layer 110 and AMC antenna 10 is set up for operation, e.g., in the above-described configuration shown in FIG. 1.

With the AMC antenna in an operational configuration, a robotic arm or the like (e.g., actuator 260 with link 262) may secure the AMC antenna to the surface 285 of the carrier. In an embodiment, balun 350 is already hardwired to an RF front end of a communication system, e.g., through a flexible cable (not shown) having a section coiled within retaining structure 20 during stowage and uncoiled when AMC antenna 10 is removed. If balun 350 is not so hardwired, a robotic arm or the like may electrically connect balun 350 to the RF front end. In either case, active communication of signals by the AMC antenna may be initiated once the RF front end connection to balun 350 is secured.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An artificial magnetic conductor (AMC) antenna apparatus comprising:

a ground plane comprising:

a base layer comprising a conductive base surface;

a frequency selective surface layer above the base layer, the FSS layer comprising a plurality of conductive patches separated from one another; and a plurality of flexible conductors, each electrically connecting one of the conductive patches to the conductive base surface;

a flexible antenna element layer above the FSS layer, comprising at least one antenna element;

a latch mechanism between the base layer and the FSS layer, configured to transition from an unlatched state to a latched state, wherein in the latched state, the conductive base surface is fixedly separated from the FSS layer by a predetermined distance; and an inflatable bladder system between the base layer and the FSS layer, configured to receive a gas input during deployment of the AMC antenna apparatus and inflate to produce force sufficient to cause the latch mechanism to transition from the unlatched state to the latched state.

2. The AMC antenna apparatus of claim 1, wherein the inflatable bladder system comprises:

a first inflatable bladder portion extending longitudinally between a first peripheral portion of the base layer and a first peripheral portion of the FSS layer; and a second inflatable bladder portion extending longitudinally between a second peripheral portion of the base layer and a second peripheral portion of the FSS layer, wherein the second peripheral portion of the base layer is opposite the first peripheral portion of the base layer and the second peripheral portion of the FSS layer is opposite the first peripheral portion of the FSS layer.

3. The AMC antenna apparatus of claim 1, further comprising a retaining structure configured to retain, when the AMC antenna apparatus is stowed: (i) the antenna element layer; (ii) the ground plane with the FSS layer collapsed towards the base surface; and (iii) the inflatable bladder system.

4. The AMC antenna apparatus of claim 3, further comprising at least one actuator configured to remove the antenna element layer, the ground plane, and the inflatable bladder system from the retaining structure.

5. The AMC antenna apparatus of claim 4, wherein the retaining structure retains the antenna element layer, the ground plane, and the inflatable bladder system in a coiled state.

6. The AMC antenna apparatus of claim 5, wherein the retaining structure is a cylindrical structure comprising a pair of spiraling grooves in respective opposite ends, wherein opposite edge portions of the ground plane are retained coiled within the pair of spiraling grooves.

7. The AMC antenna apparatus of claim 1, wherein:

the FSS layer comprises a first dielectric sheet and the plurality of conductive patches are printed conductive patches on the first dielectric sheet; and the at least one antenna element is at least one printed conductive element on a second dielectric sheet;

wherein each of the first and second dielectric sheets is flexible.

8. The AMC antenna apparatus of claim 1, further comprising a flexible antenna feed having a first end electrically connected to the at least one antenna element, an opposite end below the base layer, and a central portion extending between the base surface and the at least one antenna element through at least one opening in the FSS layer.

9. The AMC antenna apparatus of claim 8, further comprising a balun disposed below the base layer and connected to the opposite end of the antenna feed.

10. The AMC antenna apparatus of claim 1, wherein the at least one antenna element comprises at least one crossed-dipole antenna element.

11. The AMC antenna apparatus of claim 1, wherein the base layer further comprises a flexible dielectric substrate, and the conductive base surface is printed conductive material on the flexible dielectric substrate.

12. The AMC antenna apparatus of claim 1, further comprising a plurality of flexible printed circuit boards (PBCs), each disposed between the base layer and the FSS layer and each including a group of the plurality of flexible conductors, wherein each said flexible PCB is oriented substantially orthogonal to the base layer and the FSS layer when the latch mechanism is in the latched state, and is oriented non-orthogonal to adjacent portions of each of the base layer and the FSS layer when the latch mechanism is unlatched.

13. The AMC antenna apparatus of claim 1, wherein the latch mechanism comprises a plurality of individual latches distributed between at least two peripheral portions of the FSS layer and at least two corresponding peripheral portions of the base layer.

14. A method of stowing and deploying an artificial magnetic conductor (AMC) antenna on an unmanned carrier, the method comprising:

stowing the AMC antenna in a retaining structure, wherein the AMC antenna comprises: (i) an antenna element layer; (ii) a ground plane comprising a frequency selective surface (FSS) layer, a base layer below the FSS layer and including a conductive base surface; (iii) a latch mechanism between the base layer and the FSS layer; and (iv) an inflatable bladder system between the base layer and the FSS layer;

during deployment of the AMC antenna:

removing the AMC antenna from the retaining structure using an actuator; and inflating the inflatable bladder to produce a force sufficient to cause the latch mechanism to transition from an unlatched state to a latched state, wherein in the latched state, the conductive base surface is fixedly separated from the FSS at a predetermined distance.

15. The method of claim 14, wherein the unmanned carrier is an orbital satellite.

16. The method of claim 14, wherein the retaining structure retains the AMC antenna in a coiled state, and the actuator causes the AMC antenna to be rolled out of the retaining structure in a plate-like shape.

17. The method of claim 14, wherein the AMC antenna further comprises a flexible antenna feed stored in a coiled shape within the retaining structure, the flexible antenna feed unrolling during the removal of the AMC antenna.

* * * * *